(12) United States Patent
Packwood

(10) Patent No.: US 11,631,019 B2
(45) Date of Patent: Apr. 18, 2023

(54) COMPUTING NETWORKS

(71) Applicant: SEECHANGE TECHNOLOGIES LIMITED, Manchester (GB)

(72) Inventor: David Packwood, Cambridge (GB)

(73) Assignee: SEECHANGE TECHNOLOGIES LIMITED, Manchester (GB)

( * ) Notice: Subject to any disclaimer, the term of this patent is extended or adjusted under 35 U.S.C. 154(b) by 409 days.

(21) Appl. No.: 16/834,920

(22) Filed: Mar. 30, 2020

(65) Prior Publication Data

US 2021/0304041 A1   Sep. 30, 2021

(51) Int. Cl.

| | | |
|---|---|---|
| *G06N 5/04* | (2006.01) | |
| *G06N 20/20* | (2019.01) | |
| *G06N 3/08* | (2006.01) | |
| *G06N 3/04* | (2006.01) | |
| *H04L 29/08* | (2006.01) | |
| *G06N 5/046* | (2023.01) | |
| *H04L 67/12* | (2022.01) | |

(52) U.S. Cl.
CPC ............ *G06N 5/046* (2013.01); *G06N 3/0454* (2013.01); *G06N 3/08* (2013.01); *G06N 20/20* (2019.01); *H04L 67/12* (2013.01)

(58) Field of Classification Search
CPC ......... H04L 67/12; H04L 67/10; G06N 20/20; G06N 3/0454; G06N 3/08; G06N 5/046; G06N 3/063; G06N 20/10
See application file for complete search history.

(56) References Cited

U.S. PATENT DOCUMENTS

| | | | |
|---|---|---|---|
| 11,164,085 B2* | 11/2021 | Rahnama Moghaddam ............... | G06N 3/084 |
| 11,250,326 B1* | 2/2022 | Ko .......................... | G06F 17/10 |
| 2017/0099200 A1* | 4/2017 | Ellenbogen ............. | H04L 67/10 |
| 2017/0154246 A1* | 6/2017 | Guttmann ............... | H04L 67/10 |
| 2018/0181868 A1 | 6/2018 | Chew | |
| 2019/0294999 A1* | 9/2019 | Guttmann ............ | G06K 9/6257 |
| 2020/0097706 A1* | 3/2020 | Fisher ...................... | G06N 5/04 |
| 2021/0014216 A1* | 1/2021 | Ford ........................ | H04L 63/20 |
| 2021/0097396 A1* | 4/2021 | Vivekraja ............. | G06N 3/0454 |
| 2021/0209494 A1* | 7/2021 | Mukherjee .............. | H04L 67/12 |
| 2021/0304010 A1* | 9/2021 | Sengupta ............... | G06N 3/063 |

OTHER PUBLICATIONS

Combined Search and Examination Report for GB Application No. 2104065.4 dated Jan. 26, 2022, 9 pages.

* cited by examiner

*Primary Examiner* — Abdullahi E Salad
(74) *Attorney, Agent, or Firm* — Nixon & Vanderhye P.C.

(57) ABSTRACT

A computing network has a sensor, a first processor in a first computing network location, and a second processor in a second computing network location, the second computing network location further from the sensor than the first computing network location. The first processor is configured to receive sensor data from the sensor and configured to operate a first machine learning model to make a first inference based on the sensor data. The second processor is configured to receive the sensor data and to operate a second machine learning model to make a second inference based on the sensor data in response to a trigger. The computing network is configured to collate and process the first and second inferences to make an aggregated inference.

18 Claims, 13 Drawing Sheets

COMPUTING NETWORKS

BACKGROUND OF THE INVENTION

Field of the Invention

The present invention relates to computing networks.

Description of the Related Technology

Machine learning models, at inference time, may operate on data being received in real time from various types of sensors. These sensors are located at the edge of computing networks, and provide input data for the computing networks. Using an ensemble of models is a known method to improve the quality of machine learning. Multiple models receive the same input, they may produce slightly different inferences and the final inference is arrived at by aggregated voting of the models. The more models which vote the more robust the decision will be.

SUMMARY

According to a first aspect of the present disclosure there is provided a computing network comprising a sensor, a first processor in a first computing network location, and a second processor in a second computing network location, the second computing network location further from the sensor than the first computing network location, the first processor configured to receive sensor data from the sensor and configured to operate a first machine learning model to make a first inference based on the sensor data, and the second processor configured to receive the sensor data and to operate a second machine learning model to make a second inference based on the sensor data in response to a trigger, wherein the computing network is configured to collate and process the first and second inferences to make an aggregated inference.

According to a second aspect of the present disclosure, there is provided a method comprising: receiving sensor data from a sensor of a computing network; making a first inference based on the sensor data using a first machine learning model run by a first processor in a first computing network location; in response to a trigger, making a second inference based on the sensor data using a second machine learning model run by a second processor in a second computing network location, the second computing network location being further from the sensor than the first computing network location; and collating and processing the first and second inferences to make an aggregated inference.

Further features will become apparent from the following description, given by way of example only, which is made with reference to the accompanying drawings.

DETAILED DESCRIPTION OF CERTAIN INVENTIVE EMBODIMENTS

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

In examples herein, computing networks comprise a sensor, a first processor in a first computing network location, and second processor in a second computing network location, the second computing network location further from the sensor than the first computing network location. The first processor is configured to receive sensor data from the sensor and configured to operate a first machine learning model to make a first inference based on the sensor data, and the second processor is configured to receive the sensor data and to operate a second machine learning model to make a second inference based on the sensor data in response to a trigger. The computing network is configured to collate and process the first and second inferences to make an aggregated inference.

In computing networks where machine learning models are used to make inferences, there is typically a balance to be reached with regard to the robustness of an inference to be made, the processing power available, and the latency of the inference to be made. For example, for certain types of sensor data a low latency inference may be required, which may necessitate running a machine learning model at the edge of the computing network, in the region of the sensor, where low computing power may be available. This may result in a less robust inference due to the lower computing power available at the edge. In contrast, for other types of sensor data a highly robust inference may be required, which may necessitate running a machine learning model remotely from the edge of a computing network, for example in the cloud, where more computing power is available, at the cost of increased latency. By utilizing a second processor configured to receive the sensor data and to operate a second machine learning model to make a second inference based on the sensor data in response to a trigger, the second machine learning model may be utilised in response to the trigger, thereby enabling the second machine learning model to be used in addition to the first machine learning model where it is deemed appropriate to do so.

Figure 1:
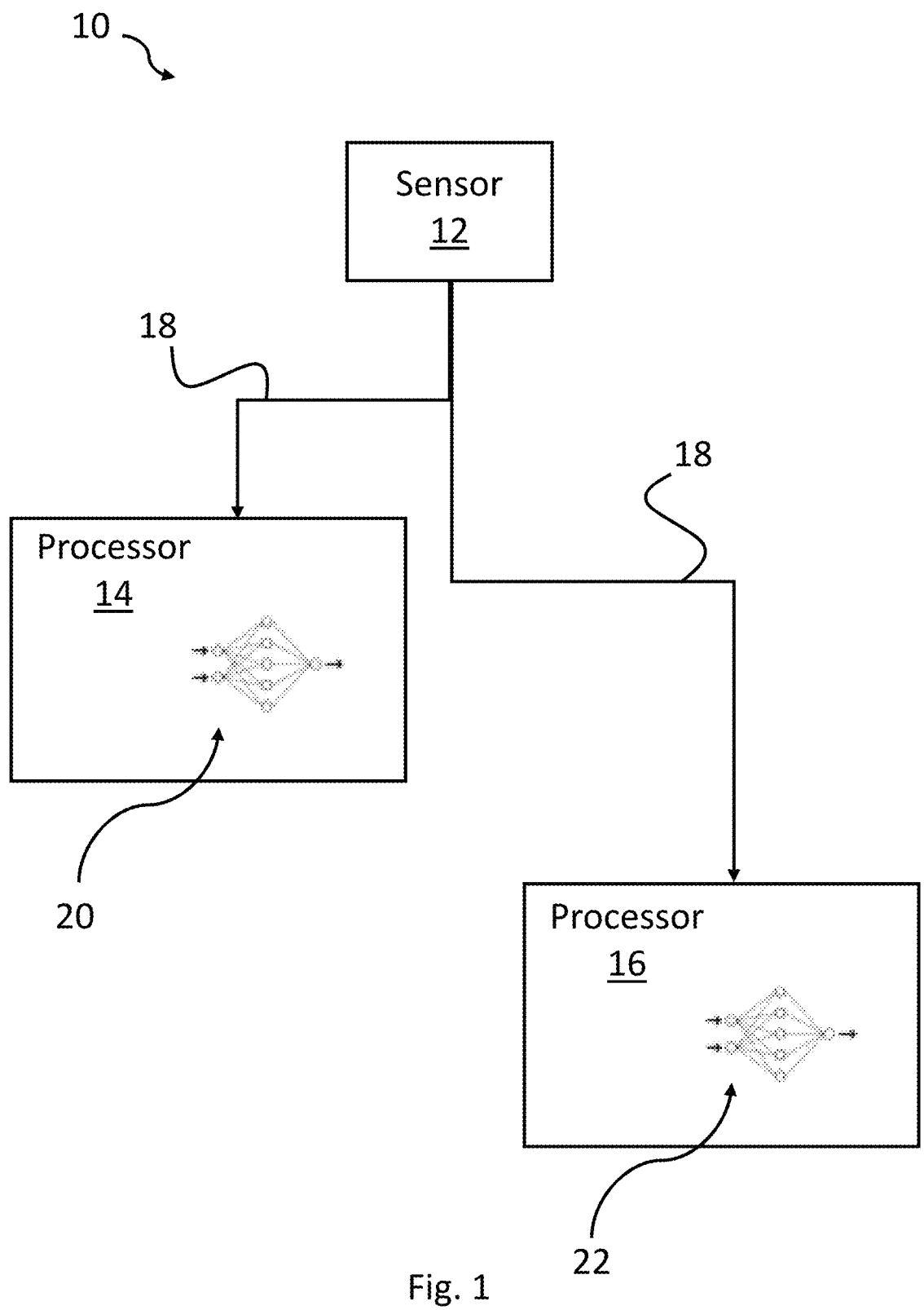
FIG. 1 is a schematic view of a computing network according to a first example.

A computing network according to an example, generally designated 10, is shown schematically in FIG. 1.

The computing network 10 comprises a sensor 12, a first processor 14, and a second processor 16. The sensor 12 is an appropriate sensor for capturing data to be utilised by the computing network 10. In some examples the sensor 12 may be an image capture sensor, for example a camera or video camera or the like. The sensor 12 is communicatively coupled to the first processor 14 via a first communication channel, which may use an industry-standard communication technology. The sensor 12 is configured to pass sensor data 18 to the first processor 14 via the first communication channel. The sensor 12 is communicatively coupled to the second processor 16 via a second communication channel, which may use an industry-standard communication technology similar or the same to that of the first communication channel. The sensor 12 is configured to also pass the sensor data 18 to the second processor 16 via the second communication channel. Where the sensor 12 is an image capture sensor, the sensor data 18 may comprise image data, for example in the form of picture or video content.

The first processor 14 is at a first computing network location relative to the sensor 12 within the computing network 10. For example, the first processor 14 may be within the sensor 12, or within a local network of the sensor 12, eg in a gateway device or a further sensor connected, either wired or wirelessly, to the sensor 12. The first processor 14 is configured to operate a first machine learning model 20, with the first machine learning model 20 using the sensor data 18 as an input, and configured to make a first inference based on the sensor data 18. The nature of the first machine learning model 20 may depend on the nature of the sensor 12, and hence the sensor data 18, but in some examples the first machine learning model 20 may take the form of a classifier to identify or classify one or more objects or sets of objects present in the sensor data 18. For example, in some embodiments the first machine learning model 20 may comprise an image classifier to identify or classify one or more objects in received image data from the sensor 12.

The second processor 16 is at a second computing network location relative to the sensor 12 within the computing network 10, with the second computing network location being further from the sensor 12 than the first computing network location of the first processor 14. For example, where the first processor 14 is within the sensor 12, the second processor 16 may be in a local network of the first processor 14 or in the cloud. Where the first processor 14 is in a local network of the sensor 12, the second processor 16 may be in the cloud. Different computing resource may be available at different computing network locations, and so the decision to operate the second machine learning model 22 may correspond to a decision to utilise additional computing power, for example where additional latency can be tolerated.

The second processor 16 is configured to operate a second machine learning model 22, with the second machine learning model 22 using the sensor data 18 as an input, and configured to make a second inference based on the sensor data 18. As in relation to the first machine learning model 20, the nature of the second machine learning model 22 may depend on the nature of the sensor 12, and hence the sensor data 18, but in some examples the second machine learning model 22 may take the form of a classifier to identify or classify one or more objects or sets of objects present in the sensor data 18. For example, in some embodiments the second machine learning model 22 may comprise an image classifier to identify or classify one or more objects in received image data from the sensor 12.

The first 20 and second 22 machine learning models may be of the same type, for example with both being image classifiers. In some examples, the first 20 and second 22 machine learning models may comprise convolutional neural networks having the same structure, but with different weightings. In some examples, the second machine learning model 22 may comprise a convolutional neural network having more convolutional layers than the first machine learning model 22. The first 20 and second 22 machine learning models may form, or form part of, an ensemble of machine learning models.

The second processor 16 is configured to operate the second machine learning model 22 in response to a trigger, and the computing network 10 is configured to collate and process, for example using either the first 14 or second 16 processor, the first and second inferences made by the first 20 and second 22 machine learning models to make an aggregated inference.

An example implementation of the computing network 10 may be a security camera system. For example, in a building security system, an intelligent system of smart cameras might, as a first response to a suspected intruder, activate security lights. This decision has very few negative consequences and a smart camera running a simple machine learning model of person detection might be allowed to make such an inference independently. A next level response might be to summon human security personnel to the location. This has more consequences and a more robust decision is desirable and may be achieved by use of a second processor further away from the camera, as in the case of the second processor 16 of the computing network 10 described above.

Another example is in autonomous vehicles. A forward-facing sensor detecting an object immediately in front of an autonomous vehicle might need to have an extremely low latency response (for example to apply braking), and hence a decision may need to be made at or within a close vicinity of the sensor. Once braking has been applied it may be acceptable to introduce some latency on a more robust inference to make a more complex response, and hence a second processor located further from the sensor, as in the case of the second processor 16 of the computing network 10 described above, may be utilised for the more robust inference.

Figure 2:
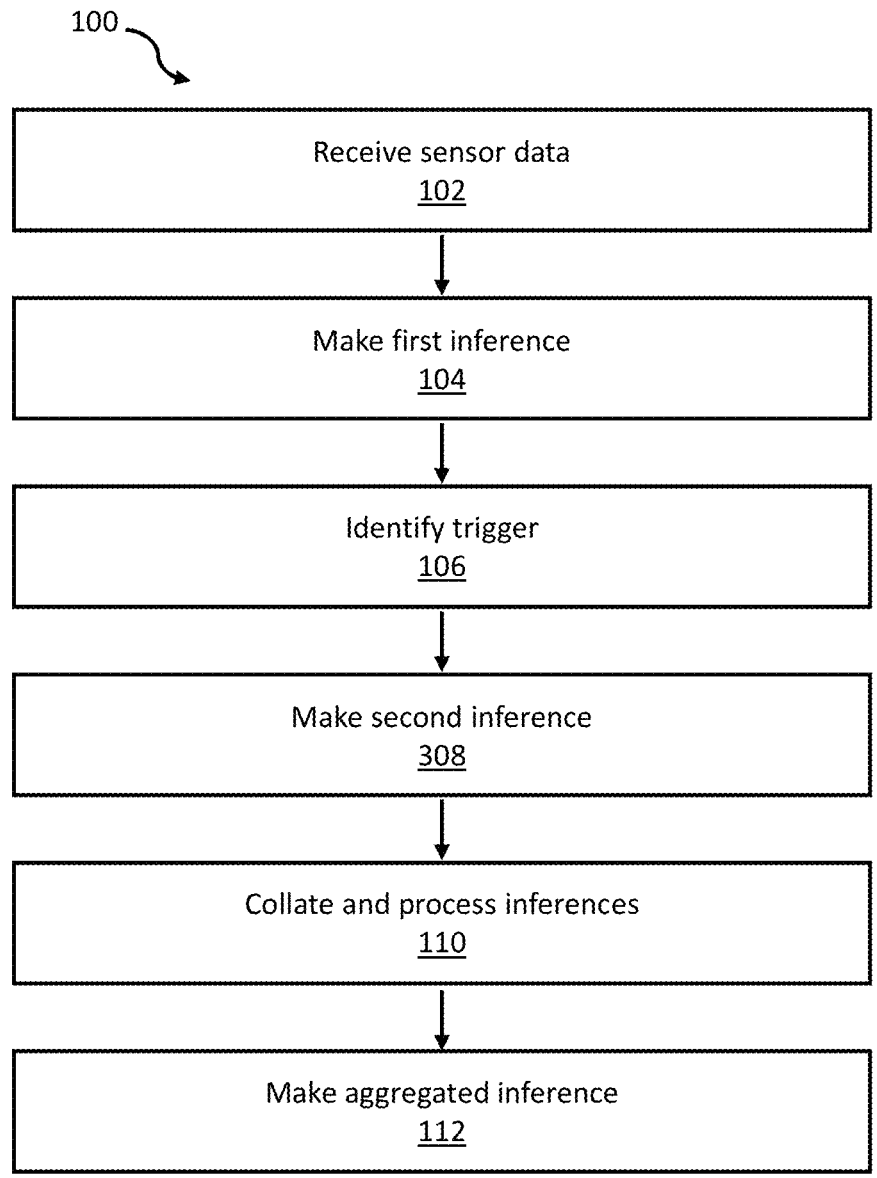
FIG. 2 is a schematic view of a first method of operating the computing network of FIG. 1.

A method 100 of operating the computing network 10 is shown schematically in FIG. 2. The method 100 comprises receiving 102 at the first processor 14 sensor data 18 from the sensor 12. A first inference is made 104 by the first machine learning model 20 running on the first processor 14. A trigger is identified 106, and a second inference is made 108 by the second machine learning model 20 running on the second processor 16. The first and second inferences are collated and processed 110 to make 112 an aggregated inference. Where no trigger is identified, the inference made by the computing network 10 may simply be the first inference.

Although in FIG. 2 the trigger is identified 106 subsequent to the first inference being made 104, it will be appreciated that in some examples the trigger may be identified prior to the first inference being made. For example, a decision as to whether or not to make the second inference may be taken upon receipt of the sensor data 18 from the sensor 12, with one or more properties of the first inference being predicted based on receipt of the sensor data 18. In some examples, the sensor data 18 may be sufficient to make one or more predictions about the first inference that will be made by the first machine learning model 20, and the trigger may comprise the one or more predictions about the first inference. The trigger may be identified subsequent to receipt of the sensor data 18.

In some examples, the trigger may comprise a determination that the first inference does not meet one or more pre-determined criteria, for example with the pre-determined criteria determined based on received sensor data. In some examples, the sensor data 18 may determine a required confidence level for an inference to be made by the computing network 10 based on the sensor data 18, and/or a maximum possible latency for the inference to be made by the computing network 10 based on the sensor data 18.

In some examples, the trigger may comprise a determination that the first inference does not meet a required level of confidence for an inference to be made by the computing network 10 based on the sensor data 18. For example, an inference to be made based on the sensor data 18 may require a confidence level above a pre-determined threshold, and the trigger may comprise a determination that a confidence level of the first inference is below the pre-determined threshold. The pre-determined threshold may depend on the sensor data 18. In some examples, the confidence level of the first inference may comprise a predicted confidence level of the first inference.

Figure 3:
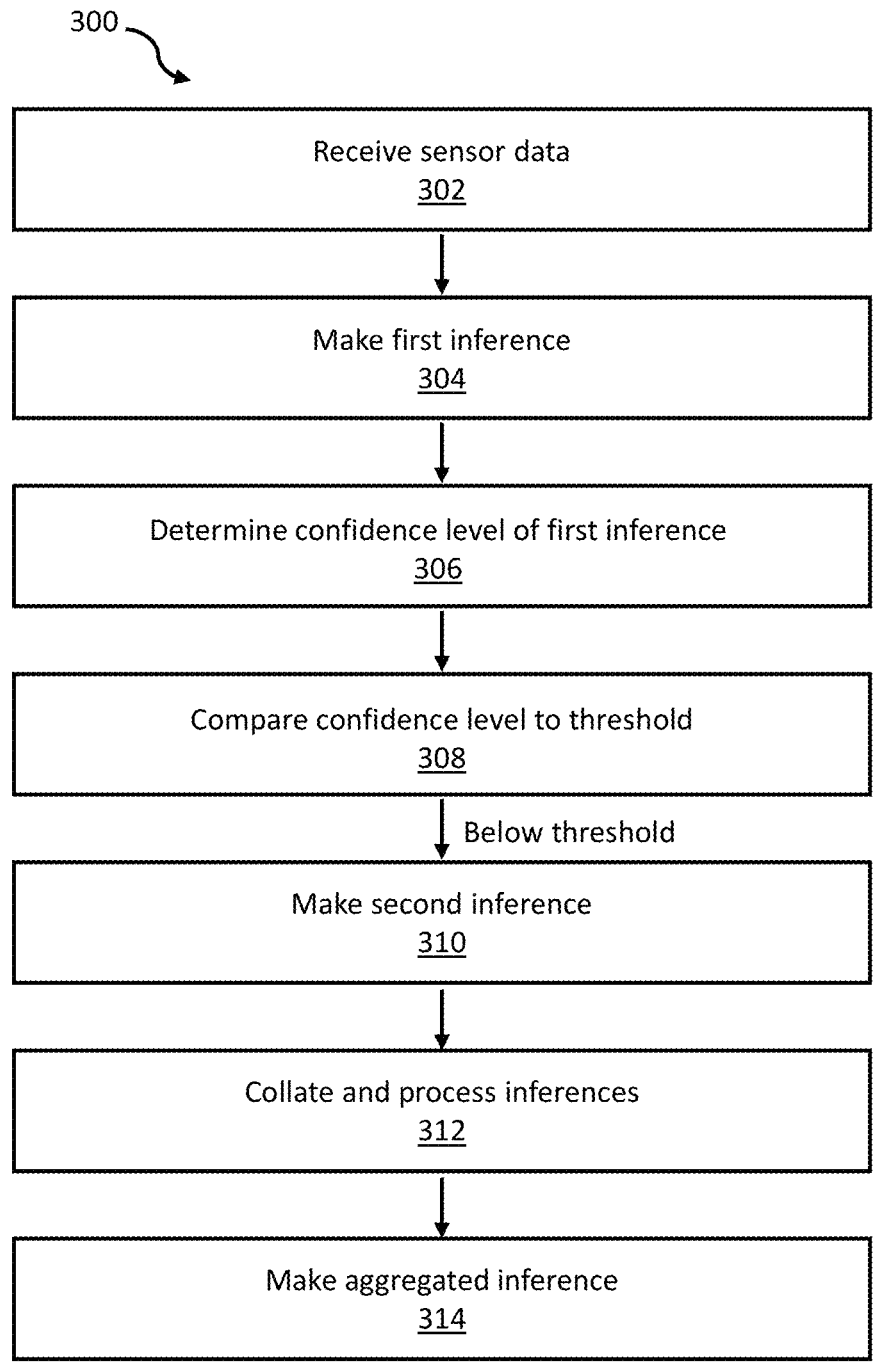
FIG. 3 is a schematic view of a second method of operating the computing network of FIG. 1.

A method 300 of operating a computer network 10 where the trigger comprises a determination that the first inference does not meet a required level of confidence for an inference to be made by the computing network 10, is shown schematically in FIG. 3.

The method 300 comprises receiving 302 at the first processor 14 sensor data 18 from the sensor 12. A first inference is made 304 by the first machine learning model 20 running on the first processor 14, and a confidence level of the first inference is determined 306. The confidence level of the first inference is compared 308 to a pre-determined threshold confidence level. Where the confidence level of the first inference is below the pre-determined threshold, a second inference is made 310 by the second machine learning model 20 running on the second processor 16. The first and second inferences are collated and processed 312 to make 314 an aggregated inference.

In some examples, the trigger may comprise a determination that a latency of the first inference is less than a maximum allowable latency for an inference to be made by the computing network 10 based on the sensor data 18. For example, an inference to be made by the computing network 10 based on the sensor data 18 may have a maximum allowable latency, and the trigger may comprise a determination that the latency of the first inference is below the maximum allowable latency. In some examples, the trigger may comprise a determination that a combination of a latency of the first inference, and a latency of the second inference, for example a predicted latency of the second inference, is less than or equal to the maximum allowable latency for an inference to be made by the computing network 10 based on the sensor data 18. In some example the latency of the first inference may be a predicted latency of the first inference.

Figure 4:
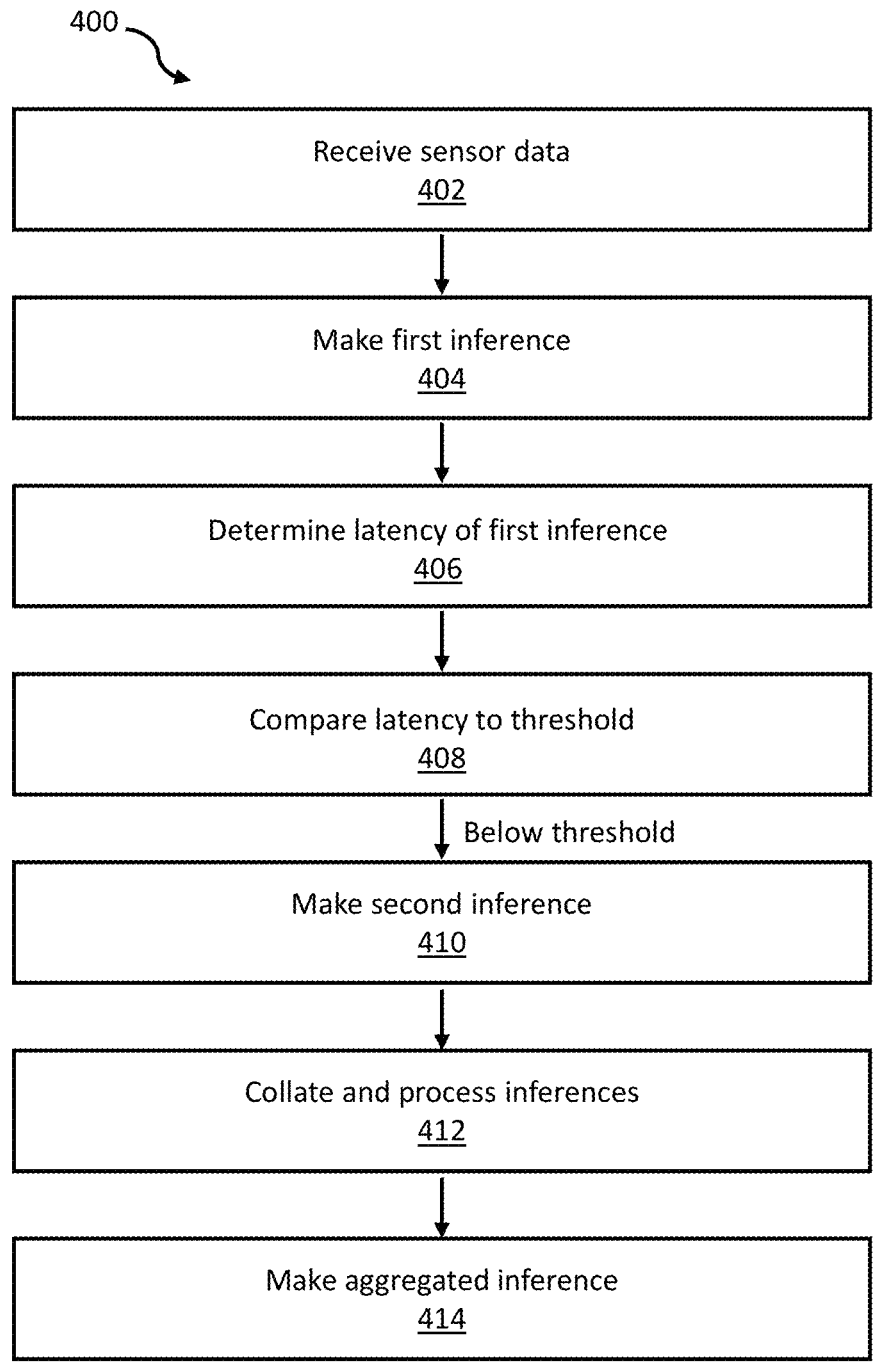
FIG. 4 is a schematic view of a third method of operating the computing network of FIG. 1.

A method 400 of operating a computing network 10 where the trigger comprises a determination that a latency of the first inference is less than a maximum allowable latency for an inference to be made by the computing network 10 based on the sensor data 18, is shown schematically in FIG. 4.

The method 400 comprises receiving 402 at the first processor 14 sensor data 18 from the sensor 12. A first inference is made 404 by the first machine learning model 20 running on the first processor 14, and a latency of the first inference is determined 406. The latency of the first inference is compared 408 to a maximum allowable latency for an inference to be made by the computing network 10 based on the sensor data 18. Where the latency of the first inference is below the pre-determined threshold, a second inference is made 410 by the second machine learning model 20 running on the second processor 16. The first and second inferences are collated and processed 412 to make 414 an aggregated inference.

In some examples the trigger may comprise a determination that computing resource is available at the second processor 16. For example, the trigger may comprise a determination that sufficient computing power is available at the second processor 16 to run the second machine learning model 22. The determination that computing resource is available at the second processor 16 may take place prior to the first inference, or subsequent to the first inference. The determination that computing resource is available at the second processor 16 may take place in response to receipt of the sensor data 18 by the first processor 14, or in response to the determination of the first inference by the first machine learning model 20. The second processor 16 may comprise more computing resource than the first processor 14.

Figure 5:
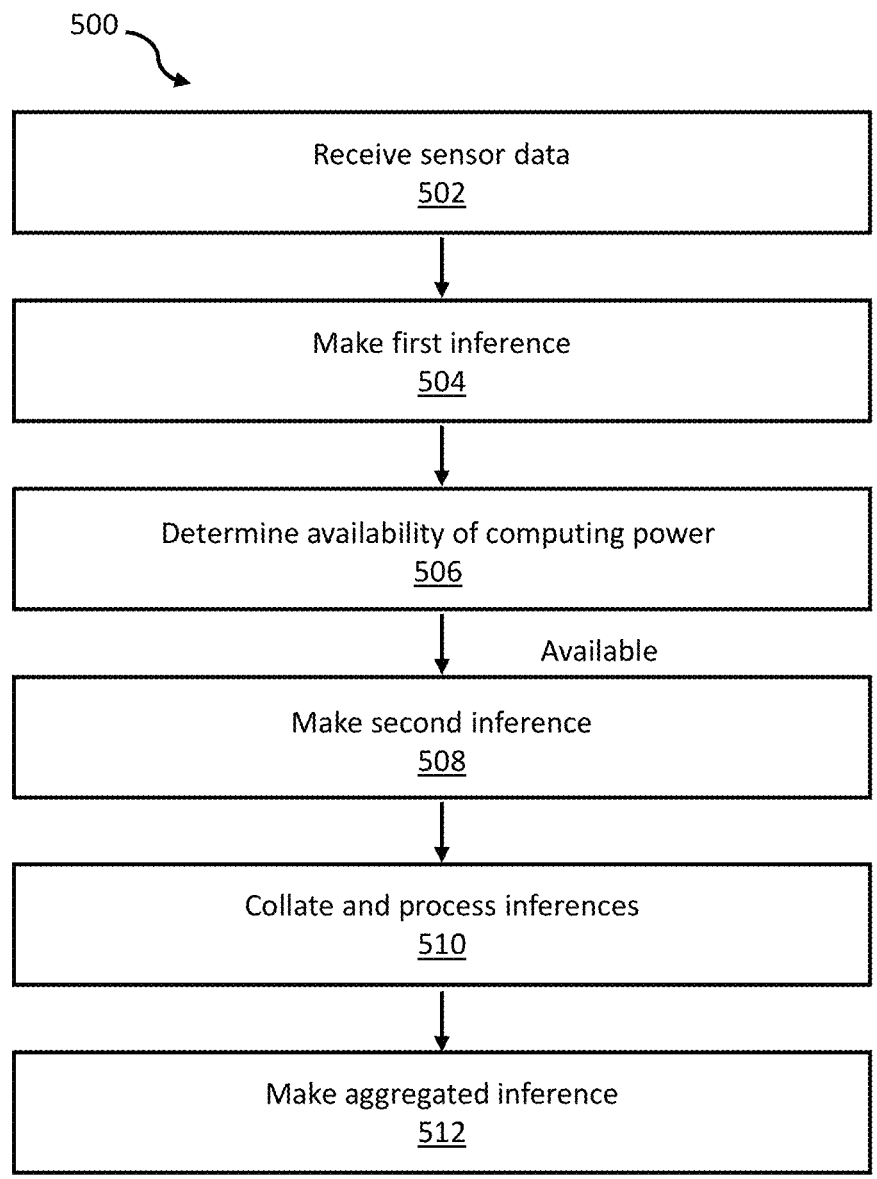
FIG. 5 is a schematic view of a fourth method of operating the computing network of FIG. 1.

A method 500 of operating a computing network 10 where the trigger comprises a determination that computing resource is available at the second processor 16 is shown schematically in FIG. 5.

The method 500 comprises receiving 502 at the first processor 14 sensor data 18 from the sensor 12. A first inference is made 504 by the first machine learning model 20 running on the first processor 14, determination is made 506 that there is available computing power at the second processor 16. A second inference is made 508 by the second machine learning model 20 running on the second processor 16. The first and second inferences are collated and processed 510 to make 512 an aggregated inference.

Figure 6:
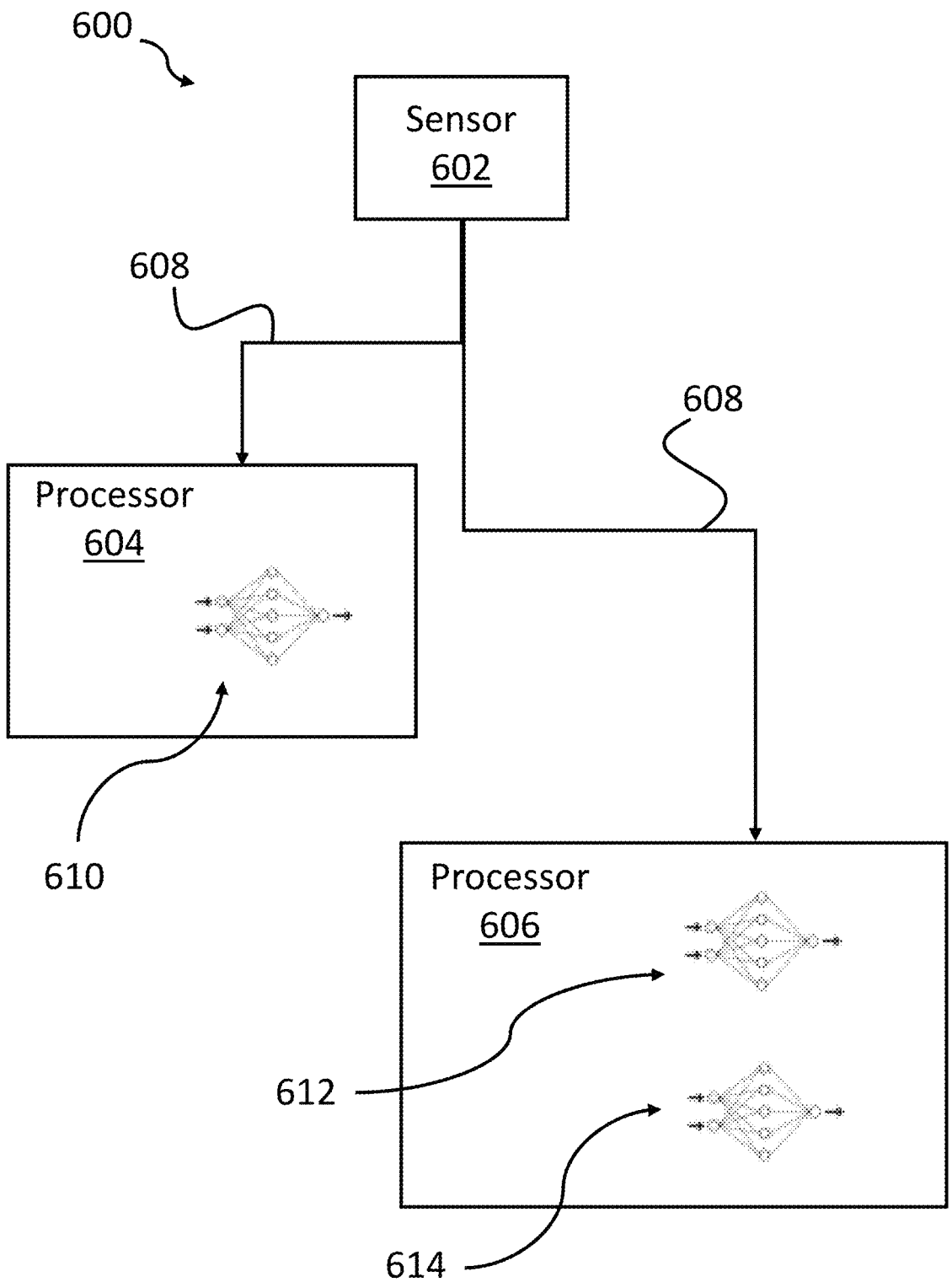
FIG. 6 is a schematic view of a computing network according to a second example.

A further example of a computing network 600 is shown schematically in FIG. 6. The computing network 600 of FIG. 6 is largely the same as the computing network 10 of FIG. 1, in that the computing network 600 of FIG. 6 comprises a sensor 602, a first processor 604 in a first computing network location, and a second processor 606 in a second computing network location further away from the sensor than the first computing network location. Sensor data 608 is passed from the sensor 602 to both the first 604 and second 606 processors. A first machine learning model 610 is run by the first processor 604 to make a first inference based on the sensor data 608, and a second machine learning model 612 is run by the second processor 606 to make a second inference based on the sensor data 608.

The computing network 600 of FIG. 6 differs, however, from the computing network of FIG. 1 in that the second processor 606 is configured to operate a third machine learning model 614 to make a third inference based on the sensor data 608. The computing network 600 is configured to collate and process, for example using either the first 604 or second 606 processor, the first, second, and third inferences made by the first 610, second 612, and third 614 machine learning models to make an aggregated inference.

As the second processor 606 is in a computing network location that is further away from the sensor than the computing network location of the first processor 604, for example further away from the edge of the computing network 10, the second processor 606 may have greater overall computing resource than the first processor 604. Thus the second processor 606 may be capable of running more machine learning models, and in response to the trigger the second processor 606 may be used to give a more robust aggregated inference. Whilst shown in FIG. 6 as operating two machine learning models, the second processor 606 may operate any number of machine learning models depending on the computing power capacity of the second processor 606.

Figure 7:
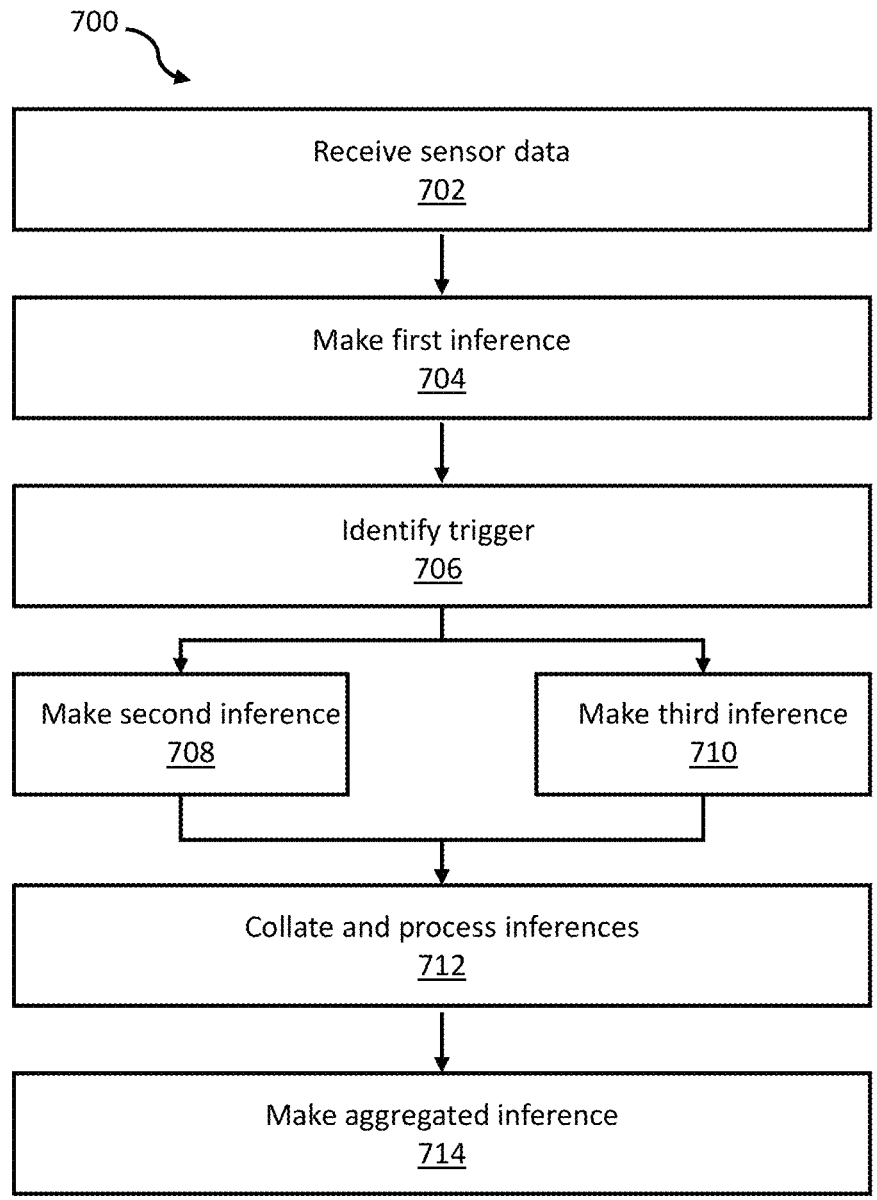
FIG. 7 is a schematic view of a method of operating the computing network of FIG. 6.

A method 700 of operating the computing network 600 of FIG. 6 is shown schematically in FIG. 7. The method 700 comprises receiving 702 at the first processor 604 sensor data 608 from the sensor 602. A first inference is made 704 by the first machine learning model 610 running on the first processor 604. A trigger is identified 706, and a second inference is made 708 by the second machine learning model 612 running on the second processor 16, and a third inference is made 710 by the third machine learning model 614 running on the second processor 606. The first, second and third inferences are collated and processed 712 to make 714 an aggregated inference.

Figure 8:
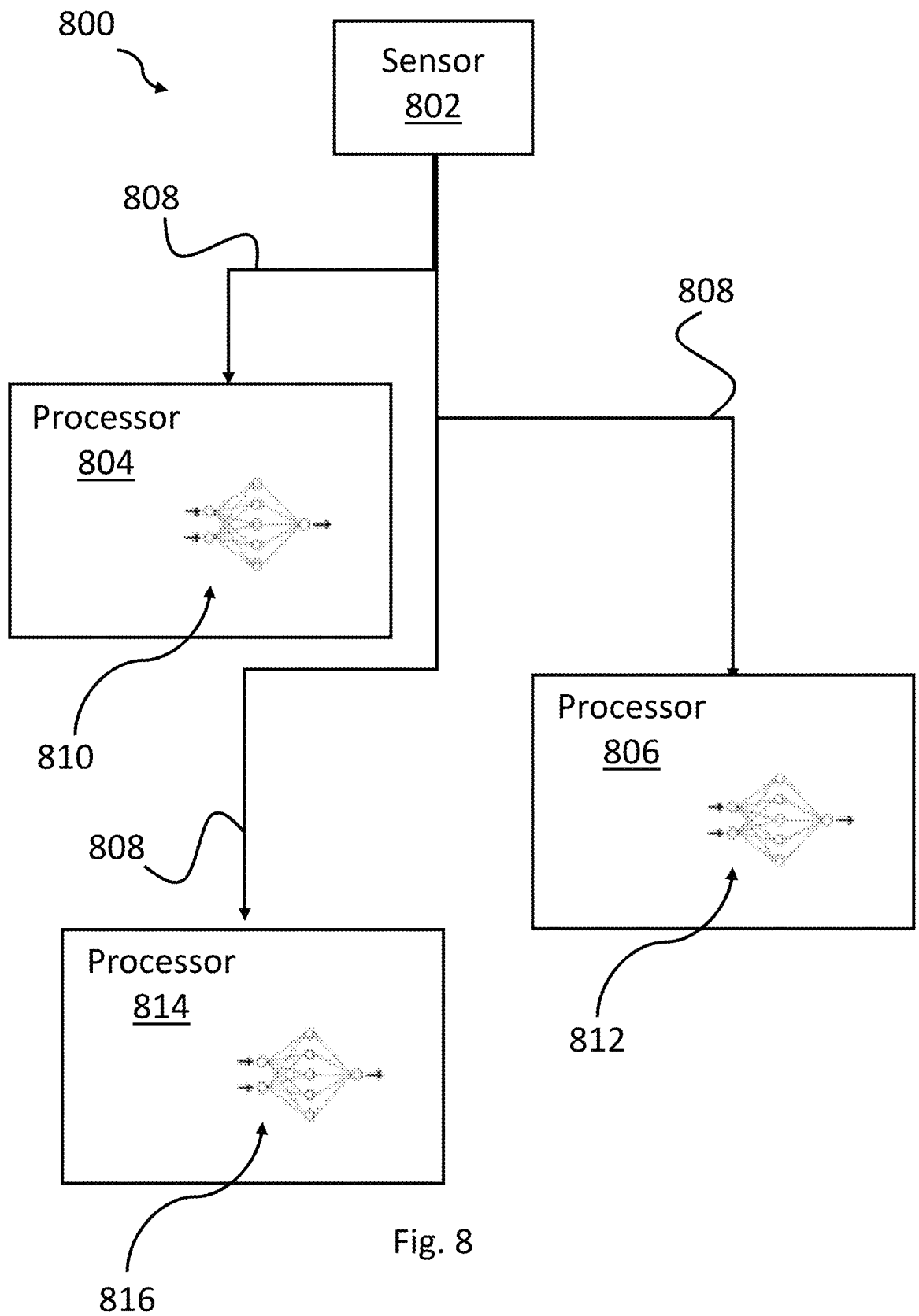
FIG. 8 is a schematic view of a computing network according to a third example.

A further example of a computing network 800 is shown schematically in FIG. 8. The computing network 800 of FIG. 8 is largely the same as the computing network 10 of FIG. 1, in that the computing network 800 of FIG. 8 comprises a sensor 802, a first processor 804 in a first computing network location, and a second processor 806 in a second computing network location further away from the sensor than the first computing network location. Sensor data 808 is passed from the sensor 802 to both the first 804 and second 806 processors. A first machine learning model 810 is run by the first processor 804 to make a first inference based on the sensor data 808, and a second machine learning model 812 is run by the second processor 806 to make a second inference based on the sensor data 808.

The computing network 800 of FIG. 8 differs, however, from the computing network of FIG. 1 in the presence of a third processor 814. The third processor 814 is in a third computing network location that is further from the sensor 802 than both the first computing network location of the first processor 804 and the second computing network location of the second processor 806. In one example, the first processor 804 may be located in the sensor 802, the second processor 804 may be located in a local network of the sensor 802, and the third processor 814 may be located in the cloud.

Whilst shown in FIG. 8 as being in a third computing network location further from the sensor 802 than both the first and second computing network locations, it will also be appreciated that in other examples the third processor 314 may be located at a third computing network location further from the sensor 802 than the first computing network location of the first processor 804, but with the second and third computing network locations of the second 806 and third 814 processors being at a similar distance from the sensor 802. For example, the first processor 804 may be in the sensor 802, whilst the second 806 and third 814 processors are at different locations in a local network of the sensor 802, or the first processor 804 may be in a local network of the sensor 802 whilst the second 806 and third 814 processors are in the cloud. Available computing resource/power may increase the further away from the sensor 802, and so use of the third processor 814 may enable use of more and/or more robust machine learning models.

The third processor 814 is configured to receive the sensor data 808, and to run a third machine learning model 816 to make a third inference. The computing network 800 is configured to collate and process, for example using any or any combination of the first 804, second 806 and third 814 processors, the first, second and third inferences made by the first 810, second 812, and third 816 machine learning models to make an aggregated inference.

The first 810, second 812, and third 816 machine learning models may be of the same type, for example with each being an image classifier. In some examples, the first 810, second 812, and third 816 machine learning models may comprise convolutional neural networks having the same structure, but with different weightings. In some examples, the second machine learning model 812 may comprise a convolutional neural network having more convolutional layers than the first machine learning model 810, and the third machine learning model 816 may comprise a convolutional neural network having more convolutional layers than the second machine learning model 812.

In some examples, the third processor 814 is configured to operate the third machine learning model to make the third inference in response to the trigger, for example the same trigger which determines operation of the second processor 806. The trigger may be identified subsequent to the first inference, or may be identified prior to the first inference, for example in response to receipt of the sensor data 808

In some examples, the third processor 814 may be configured to operate the third machine learning model 816 to make the third inference in response to a further trigger different to the trigger. For example, the second processor 806 may be configured to operate the second machine learning model 812 in response to a first trigger identified subsequent to the first inference, and the third processor 814 may be configured to operate the third machine learning model 816 in response to a second trigger identified subsequent to the second inference. In some examples, the further trigger may comprise a determination that the first and second inferences do not meet one or more pre-determined criteria, for example do not meet a required confidence level for an inference based on the sensor data 808 and/or are below a maximum allowable latency for an inference based on the sensor data 808. In some examples, a determination that the first and second inferences do not meet one or more pre-determined criteria may be based on predicted values, for example confidence levels and/or latencies, for the first and second inferences.

Figure 9:
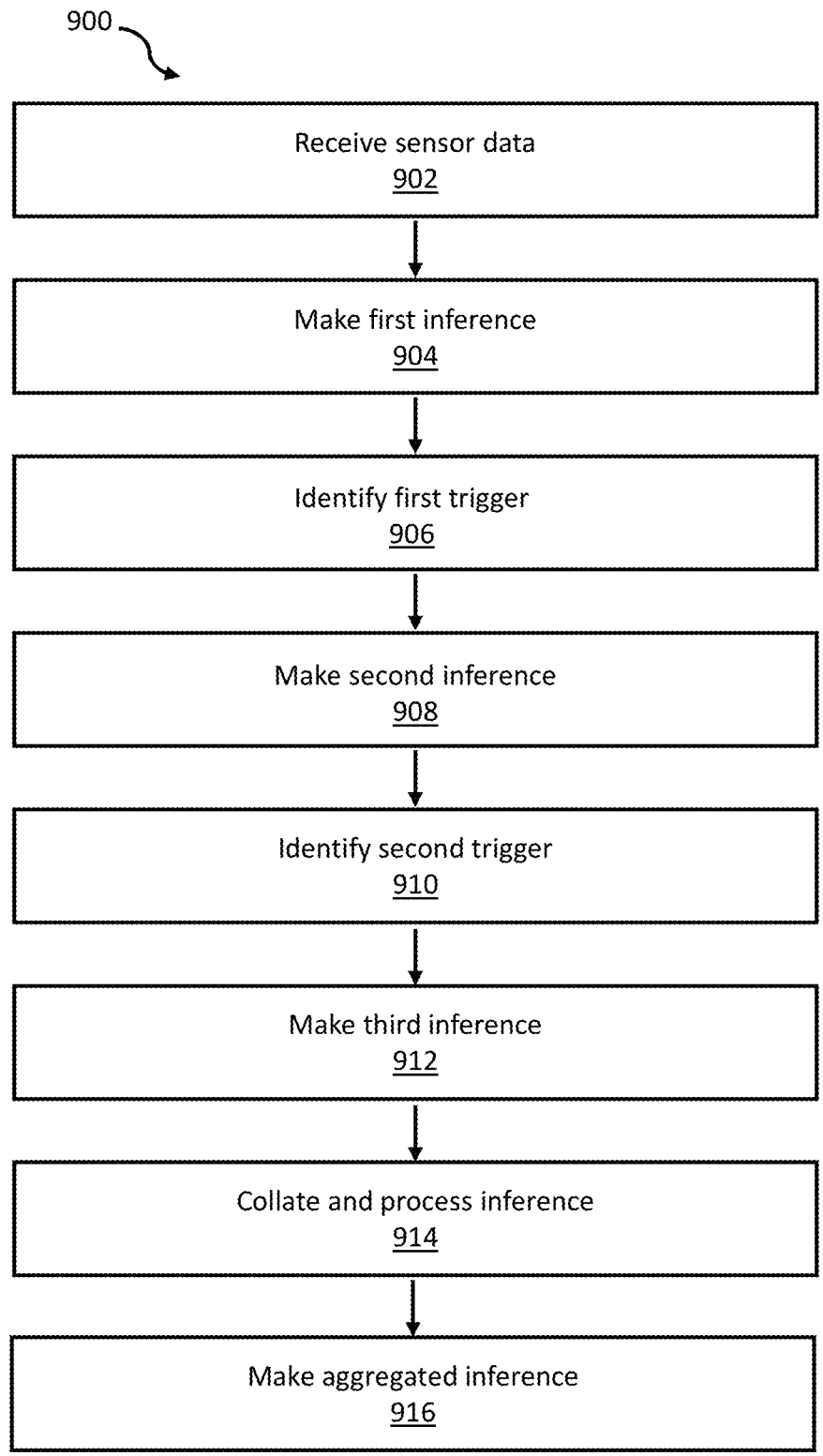
FIG. 9 is a schematic view of a method of operating the computing network of FIG. 8.

A method 900 of operating the computing network 800 of FIG. 8 is shown schematically in FIG. 9. The method comprises receiving 902 at the first processor 804 sensor data 808 from the sensor 802. A first inference is made 904 by the first machine learning model 810 running on the first processor 804. A first trigger is identified 906, and a second inference is made 908 by the second machine learning model 812 running on the second processor 806. A second trigger is identified 910, and a third inference is made 912 by the third machine learning model 816 running on the third processor 814. The first, second, and third inferences are collated and processed 914 to make 916 an aggregated inference.

Figure 10:
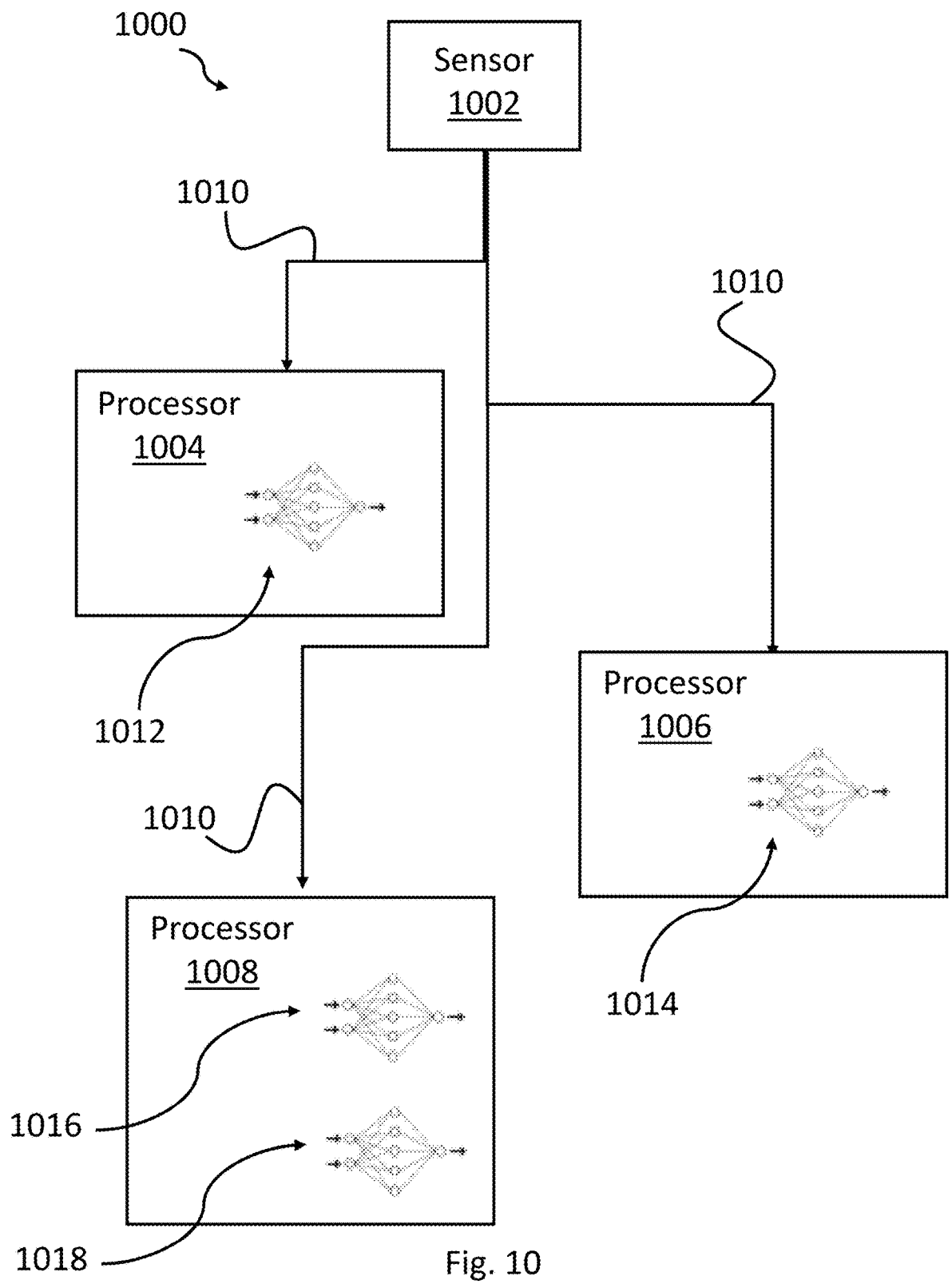
FIG. 10 is a schematic view of a computing network according to a fourth example.

A further example of a computing network 1000 is shown schematically in FIG. 10. The computing network 1000 of FIG. 10 is largely the same as the computing network 800 of FIG. 8, in that the computing network 1000 of FIG. 10 comprises a sensor 1002, a first processor 1004 in a first computing network location, a second processor 1006 in a second computing network location further away from the sensor 1002 than the first computing network location, and a third processor 1008 in a third computing network location further away from the sensor 1002 than each of the first and second computing network locations. Sensor data 1010 is passed from the sensor 1002 to each of the first 1004, second 1006 and third 1008 processors. A first machine learning model 1012 is run by the first processor 1004 to make a first inference based on the sensor data 1010, a second machine learning model 1014 is run by the second processor 1006 to make a second inference based on the sensor data 1010, and a third machine learning model 1016 is run by the third processor 1008 to make a third inference.

The computing network 1000 of FIG. 10 differs, however, from the computing network 800 of FIG. 8 in that the third processor 1008 is configured to operate a fourth machine learning model 1018 to make a fourth inference based on the sensor data 1010. The computing network 1000 is configured to collate and process, for example using any of the first 1004, second 1006, and third 1008 processors, the first, second, third, and fourth inferences made by the first 1012, second 1014, third 1016 and fourth 1018 machine learning models to make an aggregated inference. Whilst shown in FIG. 10 as operating two machine learning models, the third processor 1008 may operate any number of machine learning models depending on the computing power capacity of the third processor 1008.

Figure 11:
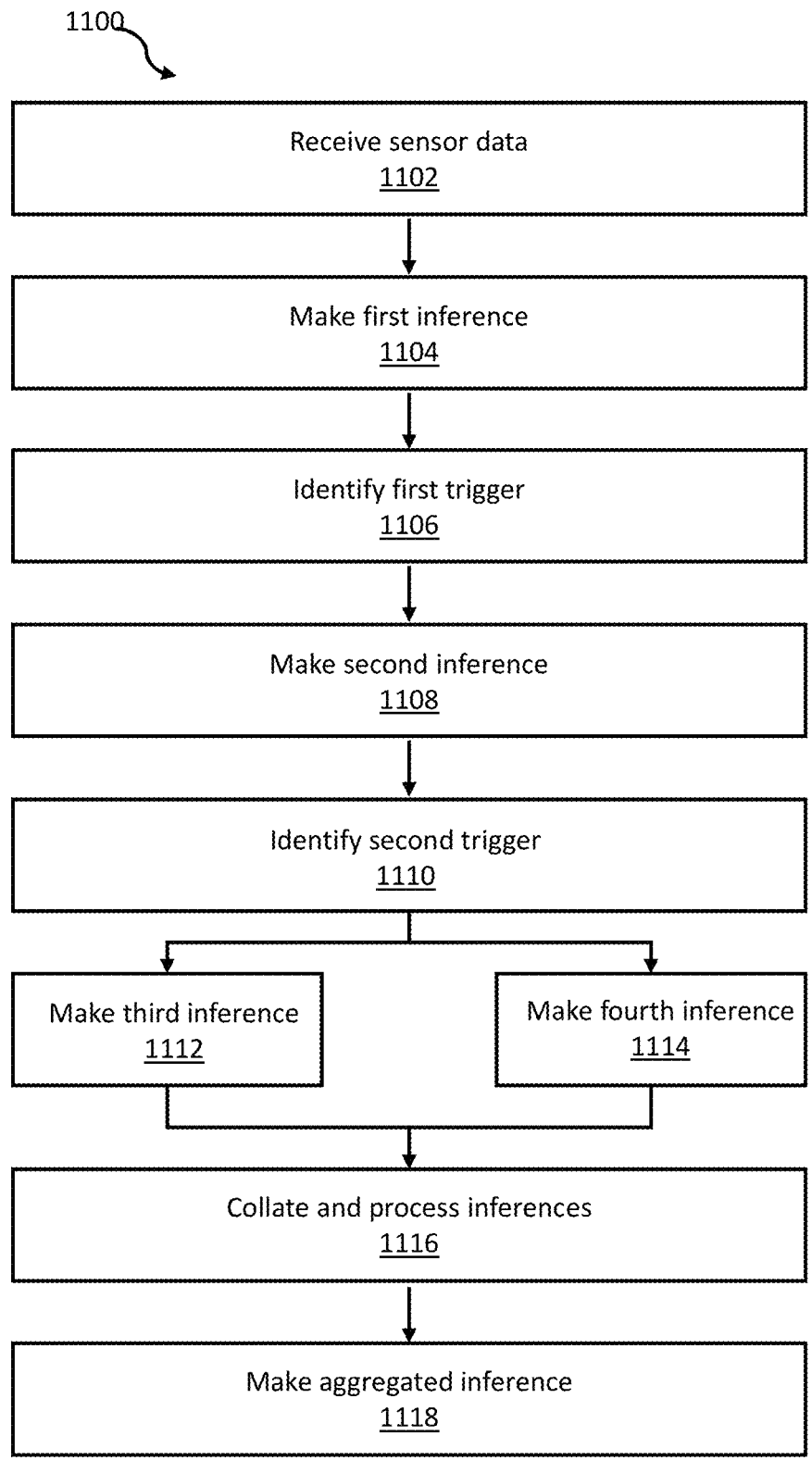
FIG. 11 is a schematic view of a method of operating the computing network of FIG. 10.

A method 1100 of operating the computing network 1000 of FIG. 10 is shown schematically in FIG. 11. The method comprises receiving 1102 at the first processor 1004 sensor data 1010 from the sensor 1002. A first inference is made 1104 by the first machine learning model 1012 running on the first processor 1004. A first trigger is identified 1106, and a second inference is made 1108 by the second machine learning model 1014 running on the second processor 1006. A second trigger is identified 1110, and a third inference is made 1112 by the third machine learning model 1016 running on the third processor 1008, and a fourth inference is made 1114 by the fourth machine learning model 1018 running on the third processor 1008. The first, second, third, and fourth inferences are collated and processed 1116 to make 1118 an aggregated inference.

Figure 12:
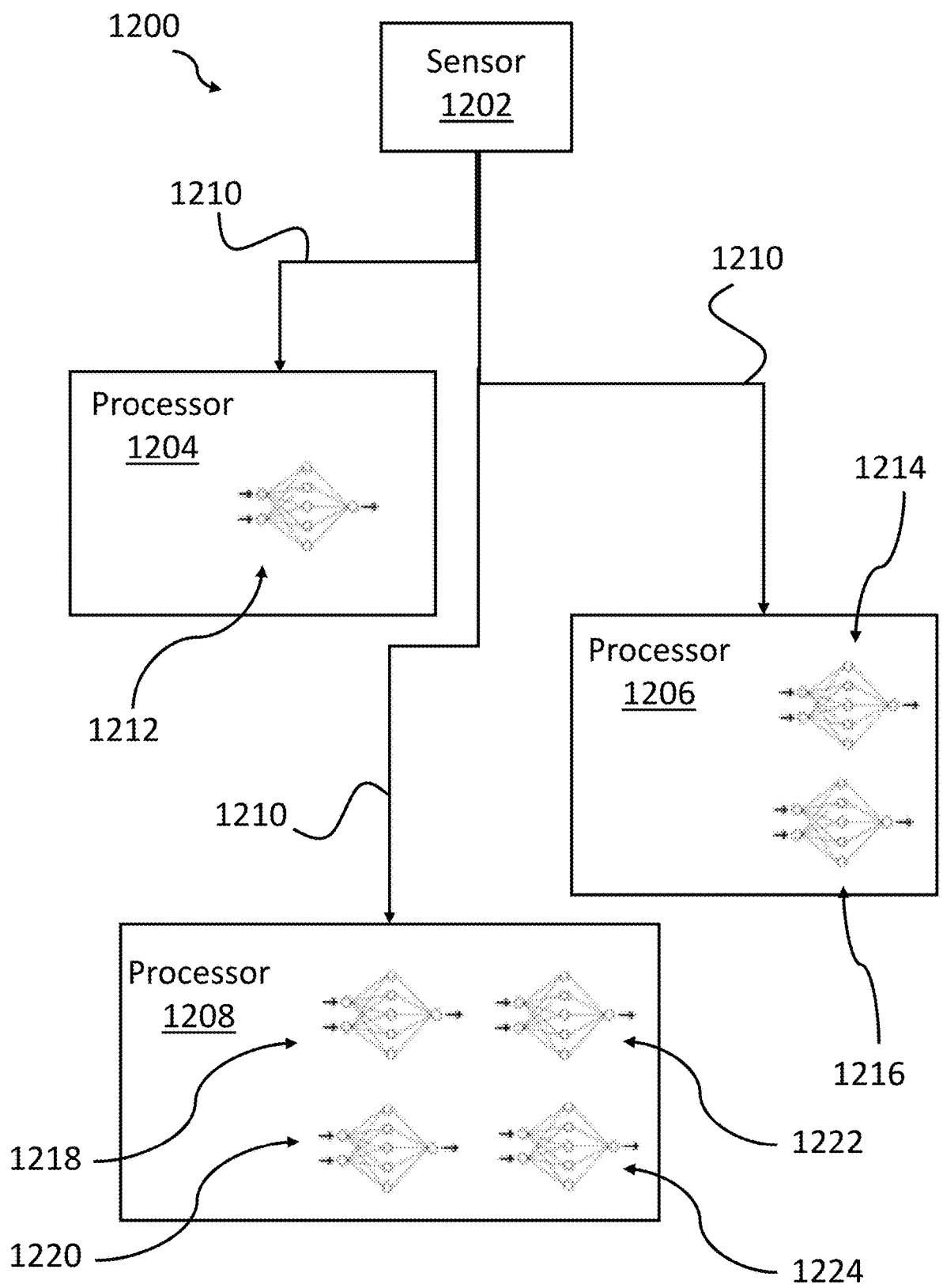
FIG. 12 is a schematic view of a computing network according to a fifth example.

A further example of a computing network 1200 is shown schematically in FIG. 12. The computing network 1200 of FIG. 12 is largely the same as the computing network 1000 of FIG. 10, and differs only in the number of machine learning models running on the different processors. Here the computing network 1200 comprises a sensor 1202, a first processor 1204 in a first computing network location, a second processor 1206 in a second computing network location further from the sensor 1202 than the first computing network location, and a third processor 1208 in a third computing network location further from the sensor 1202 than the first and second computing network locations. Here the first processor 1204 is in the sensor 1202, the second processor 1206 is in a local network of the sensor 1202, and the third processor 1208 is in the cloud. Each of the first 1204, second 1206, and third 1208 processors is configured to receive sensor data 1210 from the sensor 1202. The first processor 1204 is configured to run a first machine learning model 1212 to make a first inference based on the sensor data 1210, the second processor 1206 is configured to run second 1214 and third 1216 machine learning models to make respective second and third inferences based on the sensor data 1210, and the third processor 1208 is configured to run fourth 1218, fifth 1220, sixth 1222 and seventh 1224 machine learning models to make respective fourth, fifth, sixth and seventh inferences based on the sensor data 1210.

As computing network locations move further away from the sensor 1202, increased computing resource may be available, which may allow processors located further away from the sensor 1202 to run more machine learning models. By selectively using these processors in response to triggers, more robust inferences may be made where required.

The second processor 1206 is configured to run the second 1214 and third 1216 machine learning models in response to a first trigger, and the third processor is configured to run the fourth 1218, fifth 1220, sixth 1222 and seventh 1224 machine learning models in response to a second trigger. The first through seventh inferences are collated and processed by the computing network to make an aggregated inference based on the sensor data 1210.

Figure 13:
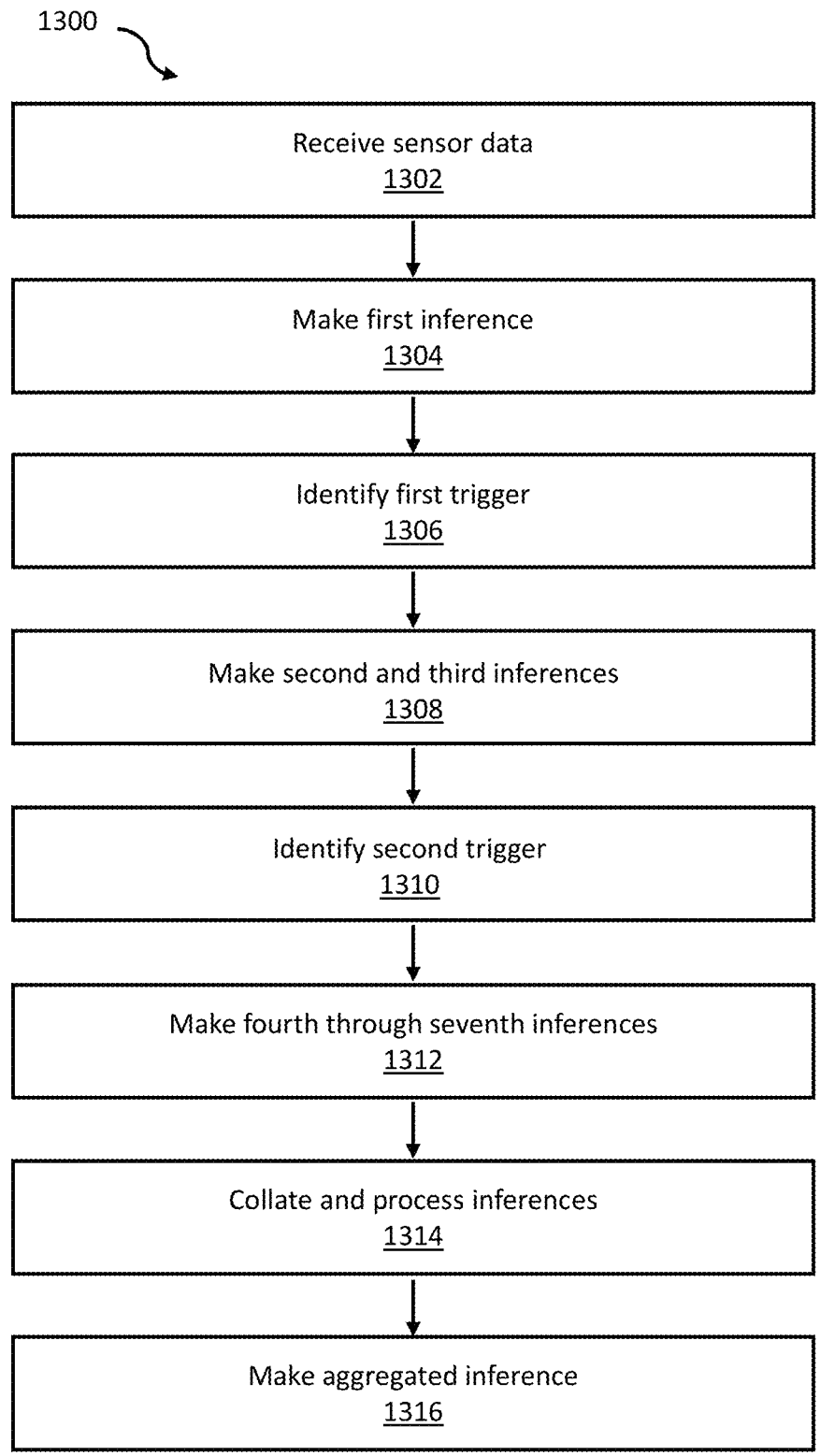
FIG. 13 is a schematic view of a method of operating the computing network of FIG. 12.

A method 1300 of operating the computing network 1200 of FIG. 10 is shown schematically in FIG. 13. The method 1300 comprises receiving 1302 at the first processor 1204 sensor data 1210 from the sensor 1202. A first inference is made 1304 by the first machine learning model 1212 running on the first processor 1204. A first trigger is identified 1306, and second and third inferences are made 1308 by the second 1214 and third 1216 machine learning models running on the second processor 1206. A second trigger is identified 1310, and fourth through seventh inferences are made 1312 by the respective fourth 1218, fifth 1220, sixth 1222 and seventh 1224 machine learning models running on the third processor 1208. The first through seventh inferences are collated and processed 1314 to make 1316 an aggregated inference.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A computing network comprising:
   a sensor,
   a first processor in a first computing network location, and
   a second processor in a second computing network location, the second computing network location further from the sensor than the first computing network location, the first processor configured to receive sensor data from the sensor and configured to operate a first machine learning model to make a first inference based on the sensor data, and the second processor configured to receive the sensor data and to operate a second machine learning model to make a second inference based on the sensor data in response to a trigger, wherein:
   the computing network is configured to collate and process the first and second inferences to make an aggregated inference,
   the second processor is configured to operate a plurality of machine learning models to make a plurality of inferences based on the sensor data, the plurality of inferences including the second inference and the plurality of machine learning models including the second machine learning model, and
   the computing network is configured to collate and process the plurality of inferences with the first inference to make the aggregated inference.

2. A computing network as claimed in claim 1, wherein the trigger comprises a determination that the first inference does not meet one or more pre-determined criteria.

3. A computing network as claimed in claim 2, wherein the one or more pre-determined criteria are determined based on received sensor data.

4. A computing network as claimed in claim 1, wherein the trigger comprises a determination that the first inference does not meet a required level of confidence for an inference to be made by the computing network based on the sensor data.

5. A computing network as claimed in claim 1, wherein the trigger comprises a determination that a latency of the first inference is less than a maximum allowable latency for an inference to be made by the computing network based on the sensor data.

6. A computing network as claimed in claim 1, wherein the trigger comprises a determination that computing resource is available at the second processor.

7. A computing network as claimed in claim 1, wherein first processor is configured to make the first inference prior to identification of the trigger.

8. A computing network as claimed in claim 1, wherein the computing network comprises a third processor in a third computing network location, the third computing network location being further from the sensor than the first computing network location, the third processor configured to receive the sensor data and to operate a third machine learning model to make a third inference based on the sensor data, and the computing network is configured to collate and process the first, second and third inferences to make the aggregated inference.

9. A computing network as claimed in 8, wherein the third processor is configured to operate the third machine learning model to make the third inference in response to the trigger.

10. A computing network as claimed in claim 8, wherein the third processor is configured to operate the third machine learning model to make the third inference in response to a further trigger different to the trigger.

11. A computing network as claimed in claim 10, wherein the further trigger comprises a determination that the first and second inferences do not meet one or more pre-determined criteria.

12. A computing network as claimed in claim 8, wherein the third processor is configured to operate a plurality of machine learning models to make a plurality of inferences based on the sensor data, the plurality of inferences including the third inference and the plurality of machine learning models including the third machine learning model, and the computing network is configured to collate and process the plurality of inferences with the first and second inferences to make the aggregated inference.

13. A computing network as claimed in claim 1, wherein the first processor is located in the sensor or in a local network of the sensor.

14. A computing network as claimed in claim 1, wherein the second processor is located in a local network of the sensor or the cloud.

15. A method comprising:
receiving sensor data from a sensor of a computing network;
making a first inference based on the sensor data using a first machine learning model run by a first processor in a first computing network location;
in response to a trigger, making a second inference based on the sensor data using a second machine learning model run by a second processor in a second computing network location, the second computing network location being further from the sensor than the first computing network location;
collating and processing the first and second inferences to make an aggregated inference;
making a plurality of inferences using a plurality of machine learning models run by the second processor, the plurality of inferences including the second inference and the plurality of machine learning models including the second machine learning model; and
collating and processing the plurality of inferences with the first inference to make the aggregated inference.

16. A method as claimed in claim 15, wherein the trigger is identified subsequent to the first inference being made.

17. A method as claimed in claim 15, wherein the method comprises making a third inference based on the sensor data using a third machine learning model run by a third processor in a third computing network location, the third computing network location being further from the sensor than the first computing network location, and collating and processing the first, second and third inferences to make the aggregated inference.

18. A method as claimed in claim 17, wherein the method comprises making a plurality of inferences using a plurality of machine learning models run by the third processor, the plurality of inferences including the third inference and the plurality of machine learning models including the third machine learning model, and collating and processing the plurality of inferences with the first and second inferences to make the aggregated inference.

* * * * *